(12) United States Patent
Barbulescu et al.

(10) Patent No.: US 9,166,889 B1
(45) Date of Patent: Oct. 20, 2015

(54) SYSTEM AND METHOD FOR COST-SAVINGS REPORTING

(75) Inventors: Marcel Barbulescu, Falls Church, VA (US); Elan Joel Blutinger, Washington, DC (US)

(73) Assignee: Alpine Audio Now, LLC, Reston, VA (US)

( * ) Notice: Subject to any disclaimer, the term of this patent is extended or adjusted under 35 U.S.C. 154(b) by 253 days.

(21) Appl. No.: 13/270,674

(22) Filed: Oct. 11, 2011

Related U.S. Application Data (60) Provisional application No. 61/479,715, filed on Apr. 27, 2011.

(51) Int. Cl.
*G06F 15/173* (2006.01)
*H04L 12/24* (2006.01)

(52) U.S. Cl.
CPC ............ *H04L 41/142* (2013.01); *H04L 41/509* (2013.01)

(58) Field of Classification Search
CPC .......................... H04L 12/2602; H04L 43/062
USPC ........................................................ 709/224
See application file for complete search history.

(56) References Cited

U.S. PATENT DOCUMENTS

| | | | |
|---|---|---|---|
| 2003/0158982 A1* | 8/2003 | Sadowsky et al. ............ | 710/107 |
| 2007/0255840 A1* | 11/2007 | Jones et al. .................... | 709/229 |
| 2009/0172167 A1* | 7/2009 | Drai et al. ..................... | 709/226 |

* cited by examiner

*Primary Examiner* — Hua Fan (57) ABSTRACT

Disclosed herein are systems, methods, and non-transitory computer-readable storage media for calculating and reporting the cost-savings associated with communicating content on a single stream of data from a content server versus communicating that same content to clients where each client has an individual data stream connection, and the comparison of those costs over various data paths. These costs can be the actual bandwidth, the data throughput, or monetary in nature. They can also include other factors beyond communication rates, such as setup, maintenance, and switching costs.

14 Claims, 6 Drawing Sheets

SYSTEM AND METHOD FOR COST-SAVINGS REPORTING

PRIORITY

This application claims priority to U.S. Provisional Patent Application No. 61/479,715, filed 27 Apr. 2011, the contents of which are herein incorporated by reference in their entirety.

BACKGROUND

1. Technical Field

The present disclosure relates to cost-savings reporting and more specifically to cost-savings reporting associated with the difference in cost between communicating content from a content server and communicating that same content directly from the content server to individual clients using individual data stream connections.

2. Introduction

Classic radio broadcasting is limited to specific geographic areas associated with the radio station, the radio station tower, and any repeater radio towers broadcasting the audio signal. While differences in tower signal strengths and attenuation differences between Frequency Modulation (FM) and Amplitude Modulation (AM) radio signals could vary specific broadcast distances, generally radio broadcasts are limited to a radius of several hundred miles. While repeater radio towers can increase this distance, such broadcast capability is often restricted by cost or by regulations from the Federal Communication Commission (FCC).

For radio broadcasts to reach larger audiences, many stations have begun communicating their audio signals over the Internet. This communication over the Internet generally requires the radio station to use a server capable of producing a multitude of connections, or sockets, where a connection can communicate data to one of a group of clients accepting the content over the internet. These connections all require a large use of bandwidth, which can be costly to maintain. As an alternative to communicating through Internet connections and using large amounts of bandwidth, some broadcasters have begun uploading communications to a server connected to phone lines. Users can then establish a telephone connection and through that telephone connection listen to streaming audio. Communicating content over a telephone connection can be advantageous because it utilizes telephone networks, such as the public switched telephone network, which can be significantly more cost-efficient to content providers than data networking over the Internet. Unknown, however, is precisely how advantageous this move can be for any given content provider.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for cost-savings reporting in a particular context in which a content provider communicates a single stream of data, which in turn is made available to a group of phone devices used to listen to the content presented in the data stream. The issue addressed in the present application relates to reporting cost-savings to the content provider which compare the costs associated with communicating the content in this manner to the potential costs if the content provider communicated the content to individual clients by providing each individual client an individual data stream. The cost-savings report informs the content provider or other user of the actual costs incurred communicating the single stream of data versus the predicted costs which would be incurred if another communication path, where each end client received their own individual data stream, were implemented. Cost-savings reports can include monetary and bandwidth savings as well as hardware and technical support costs. Cost-savings reports can also represent specific periods selected by a client, or can represent cumulative savings. The report can further provide an analysis of client behaviors, such as the number of clients added by having multiple network options, the number of clients lost without those options, and a breakdown of how those values were determined.

One exemplary method for implementing cost-savings reporting in accordance with this disclosure first determines the actual bandwidth of communicating content from a content server over a single stream of data. A prediction is then made of the bandwidth required to communicate that same content directly from the content server to the plurality of clients using individual data stream connections. The method concludes by reporting the difference in the actual bandwidth measured and the predicted bandwidth.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for cost-savings reporting of communicating content to individual clients using telephone connections rather than communicating that content via individual data stream connections. A system, method and non-transitory computer-readable media are disclosed which calculate and report to a user the advantages or disadvantages associated with each manner of communication. A brief introductory description will be provided, followed by a discussion of a basic general purpose system or computing device in FIG. 1 which can be employed to practice the concepts disclosed herein. Specific embodiments then follow.

Because of the variety of communication networks established, cost-saving opportunities often exist when one can change communication formats between networks. Two common and exemplary communication networks are the Internet and telephone networks. Both telephone networks and the Internet can receive and communicate modulated information to and from almost any corner of the globe. However, any network has specific costs and infrastructure requirements affecting those costs. For example, in most cases the Internet has greater bandwidth than telephone networks, and can carry more information. Similarly more people have access to telephone networks, either through landlines or cell phones, than to the Internet. Due to availability and quality of services, specific costs associated with using networks can vary. Because the costs of using specific networks can vary, there exists costs savings potential by using the more cost effective path within those networks.

To automatically report the cost-savings, or potential cost-savings, both actual and predicted costs are calculated. The actual costs are the costs of communicating content from a content server using a single stream of data. In certain embodiments, these costs sum together with the additional costs incurred in communicating the content from the single stream of data to individual clients. However, in one embodiment, the content provider communicates the content via the single stream of data to another entity, which charges a cost to the content provider in exchange for communicating the content over telephone connections to a plurality of clients. In this embodiment, the actual costs to the content provider for communicating the content to the clients can be the cost of using the other entity's service. A calculated prediction is then made for the costs of directly communicating that same content from the content server to the individual clients using individual data streams. A generated report compares the actual costs to the predicted costs, allowing the user to see how much of an advantage (or disadvantage) the current communication path provides. Ordinarily costs assume a monetary form. In certain embodiments, the costs reported can also be expressed as bandwidth, sockets, server space, as well as hardware and server maintenance costs.

In most cases the costs reported can be broken down to 'How much data was transmitted, and how much would it cost to communicate that same data to each customer individually?' In other cases, the process becomes much more complicated. While amount of data transmitted can be a factor, other potential factors can include: cost to connect servers to networks, hardware costs, technical support costs, minimal and maximum amounts of bandwidth available, and tax implications. Within these additional factors can be a linear or non-linear cost analysis of purchasing the sockets necessary for specific amounts of clients to connect to servers. For example, a content provider communicating content via a single stream of data using a content server to could see non-linear costs associated with adding clients. In this same example, the costs predicted for communicating the content from the content server to the individual clients over individual data streams is linear. In other words, for this client, each additional Internet socket has a fixed cost, whereas the telephone connections made by another entity managing the client telephone connections increase in a non-linear manner.

Report customization provides the level of detail the user wishes, and other factors can be included in the report beyond cost and bandwidth calculations. For instance, the report can present to the user how many clients have been added by providing an alternate communication network, and how many would be lost if a network were removed. For example, the report could show that a certain number of clients only listen over telephone connections despite being in areas with Internet access. This could be indicative of multiple things, such as they either do not have Internet access, or possibly that they have unlimited telephone access. Any number of other reasons could exist, which could be further defined with access to more data. The report could also show people who listen in areas without Internet access or those who are mobile. Examples of other data which could be useful to a user report are hourly breakdowns of clients, the technological capabilities of client devices, the geographic locations of the clients, a listenership breakdown by programming type, and social media connections.

These options for report variability provide the user a wide range of information they can receive. Whereas in certain instances the report can be simple and straightforward, in other instances the report can provide comprehensive statistics about who is listening, how they are listening, and why they are choosing to listen in a particular manner. Such a comprehensive report may not suit every user, but when used can help a user to understand potential gains and losses associated with each means of communicating the content. Should more than two means of communicating content be available, the report can show advantages and costs differentials between all communicating means.

The report can also extrapolate trends, such as increasing the number of clients and potential future savings. In extrapolating future costs, the cost calculations and the linear or non-linear increases associated with those calculations become increasingly important. For example, if an alternative communication means has limited resources, the per capita costs associated with communicating over that network could increase exponentially or geometrically as the numbers of clients increase or content bandwidth increases. Alternatively, if an alternative communication means has nearly limitless resources, the per capita costs associated with increasing clientele or content could decrease. Having discussed aspects of cost-savings reporting the disclosure now turns to FIG. 1, which discloses a basic general purpose system or computing device that employable to practice the concepts disclosed herein.

Figure 1:
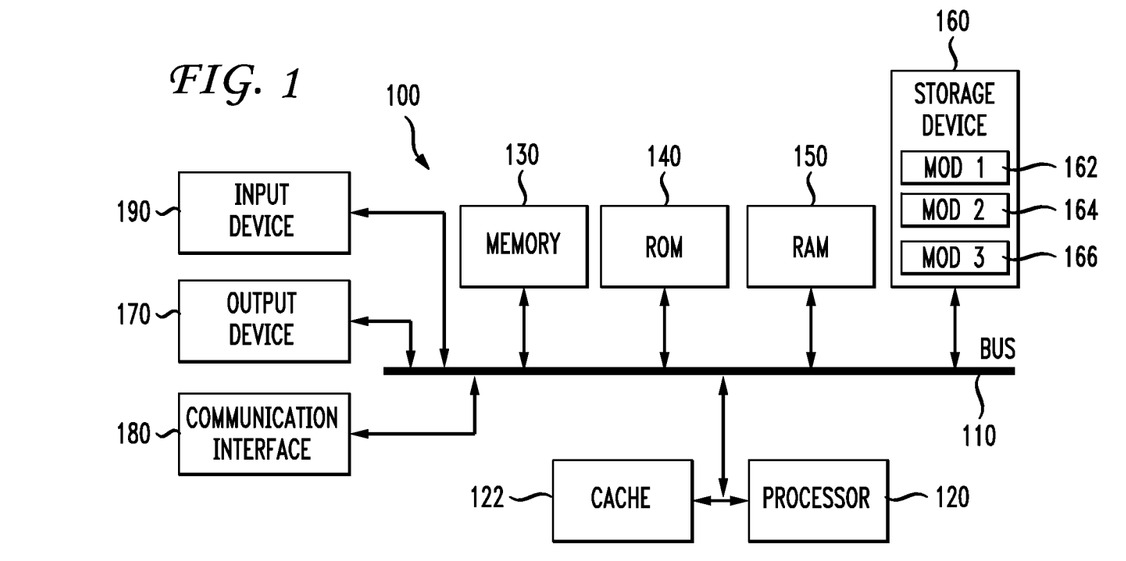
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache of high speed memory connected directly with, in close proximity to, or integrated as part of the processor 120. The system 100 copies data from the memory 130 and/or the storage device 160 to the cache for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Figure 2A:
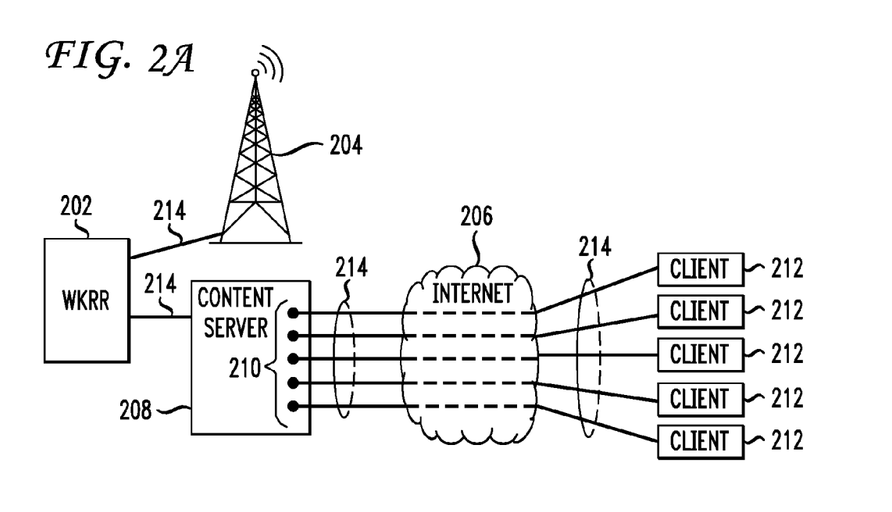
FIG. 2A illustrates a first communication path architecture.
Figure 2B:
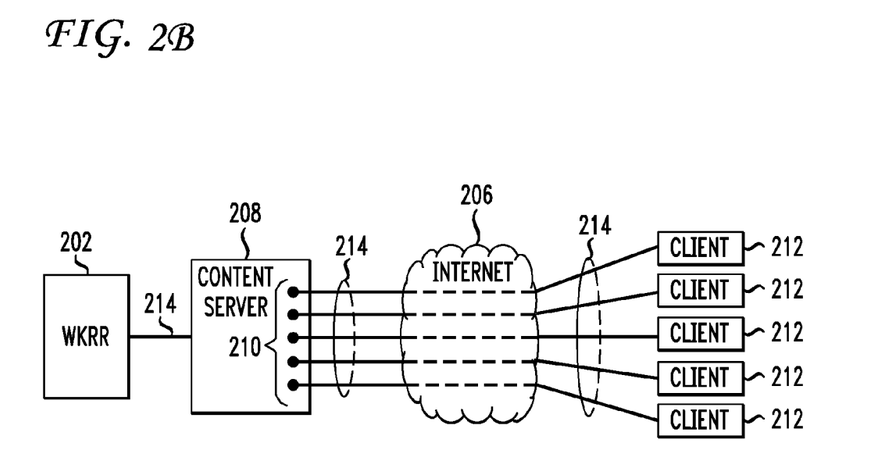
FIG. 2B illustrates a second communication path architecture.

Having disclosed some exemplary computing system components, the disclosure turns to two examples of content communication architectures. FIGS. 2A and 2B illustrate a radio station WKRR 202 communicating an audio signal 214 to clients 212. The radio station 202 in FIG. 2A has a radio tower 204 for broadcasting content while simultaneously communicating the content over the Internet 206, while in FIG. 2B the radio station 202 is only communicating the content over the Internet 206. The radio station 202 uses a content server 208 to store the audio signal 214 and create communication connections 210 with the Internet 206. Each connection to the Internet 206 requires a socket 210 and connects through the Internet 206 to a client 212, where the clients 212 are using computing devices.

Both FIG. 2A and FIG. 2B exemplify content communication architectures that could be used for cost-savings reporting comparison. In certain embodiments these communication systems represent the currently used communication systems and the system 100 calculates actual costs for communicating content from the radio station 202 to the clients 212. In other embodiments, these communication systems predict communication paths and the system 100 calculates predicted costs for communicating the content on those communication paths.

Figure 3A:
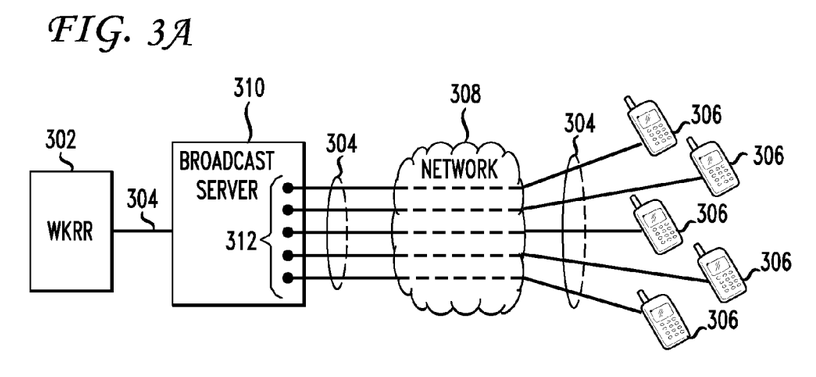
FIG. 3A illustrates a first improved communication path architecture.
Figure 3B:
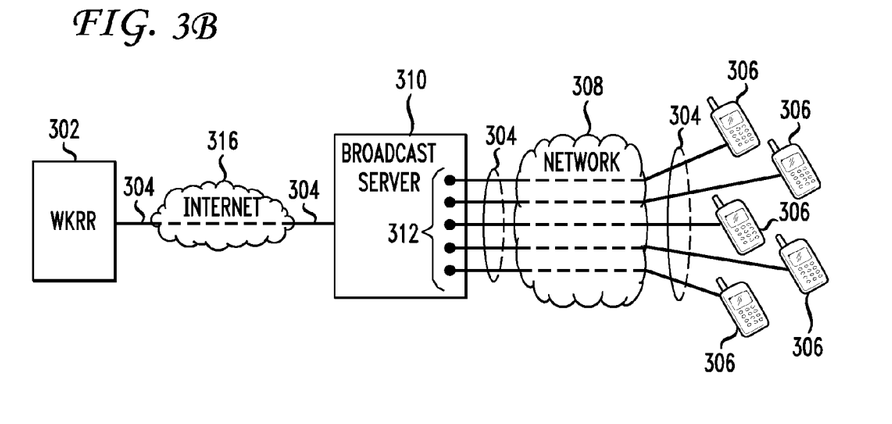
FIG. 3B illustrates a second improved communication path architecture.

FIGS. 3A and 3B illustrate alternative content communication paths. A radio station WKRR 302 broadcasts an audio signal 304 to clients 306. Here the clients are using telephone connections, such as landlines, wireless phones, cellular phones, Voice over IP phones, and the like, and receiving the audio signal 304 through a telephone network 308. In FIG. 3A, WKRR 302 communicates the audio signal 304 to a broadcast server 310 having telephone network compatible sockets 312. The broadcast server 310 then connects the audio stream 304 to the clients' phones 306. In FIG. 3B, WKRR 302 has hired or is using a broadcast server 310 not immediately connected to their audio signal 304, so it first travels through the Internet 314, and is then loaded into the broadcast server 310. This requires not only the telephone network sockets 312, but also an Internet socket 314. While the usage of a telephone network 308 and the Internet 314 are the most common communication networks for audio streams, other networks can be used if suitable for audio stream communication. As with FIGS. 2A and 2B, both FIG. 3A and FIG. 3B exemplify content communication architectures that could be used for cost-savings reporting comparison.

Figure 4A:
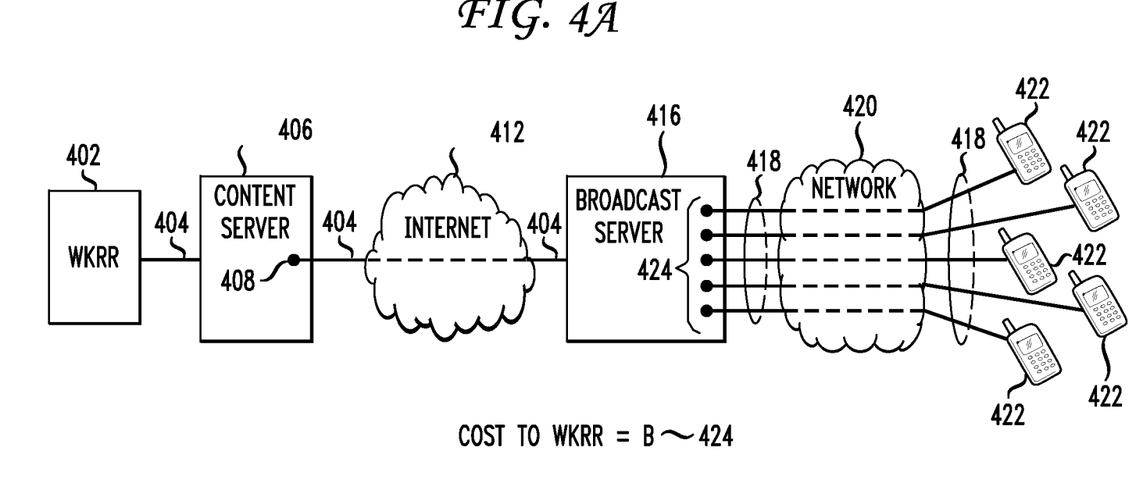
FIGS. 4A and 4B illustrate a comparison of a communication path and an improved communication path.

FIGS. 4A and 4B illustrate two communication paths as compared by a system 100 configured according to this disclosure. The system 100 first calculates the actual bandwidth used by the content communication path shown in FIG. 4A. The radio station WKRR 402 communicates content from a content server 406 via a single stream of data 404 to a broadcast server 416. A single socket 408 connects the content server 406 to the broadcast server 416 through the Internet 412. In other embodiments, the connection can be a direct connection using fiber optics, Ethernet, coaxial cable, telephone, or other uninterrupted communication means. The broadcast server 416, which can be a separate entity from the content providing radio station 402, then communicates the content to clients 422 using individual telephone connections 418. Each of the telephone connections 418 require a telephone socket 424 connected to the broadcast server 424. In one embodiment, the system 100 reports the actual costs to the content provider as the cost of communicating the single stream of data 404 from the content server 406 using the single socket 408 to the broadcast server 416. In another embodiment, the system 100 sums all the costs required for the content provider 402 to communicate content to the clients 422 into the actual cost 424. However, in instances where the broadcast server 416 is controlled by another entity, the costs to the content provider 402 are found in the cost of connecting to the broadcast server. This cost can be expressed in terms of bandwidth, monetary, time, or packets.

Figure 4B:
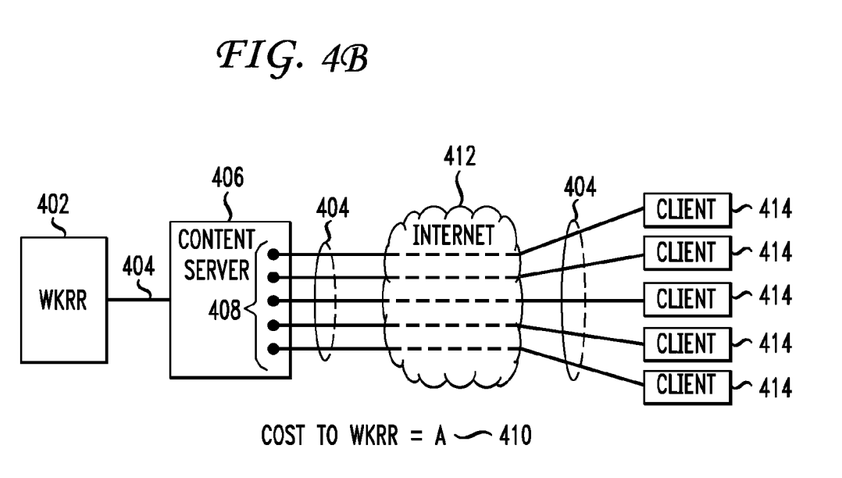

The system 100 then calculates the predicted bandwidth required to communicate that same content by the content communication path shown in FIG. 4B. The radio station WKRR 402 communicates content from a content server 406 to clients 414 via individual data stream connections 404. In this embodiment, those data stream connections 404 between the content server 406 to the clients 414 pass through the Internet 412, although in other embodiments other forms of direct communication are possible. Each direct connection from the content server 406 to the clients 414 requires a data socket 408. The system 100 sums these costs into the predicted costs 410, again expressed in terms of bandwidth, monetary, temporal, or packets. The system 100 then compares the actual costs 424 to the predicted costs 410 and reports the difference.

Figure 5:
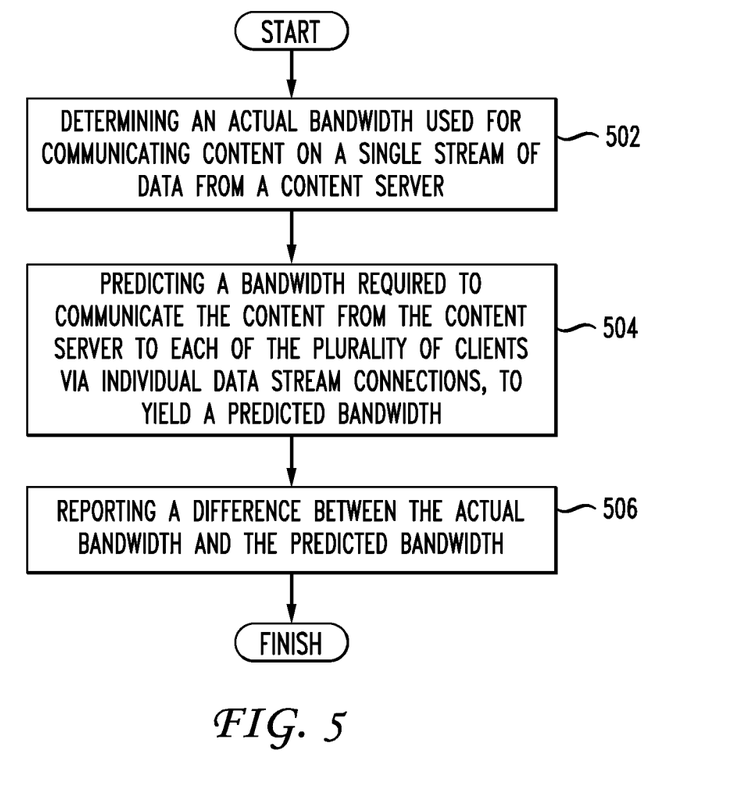
FIG. 5 illustrates an example method embodiment.

FIG. 5 illustrates an exemplary method embodiment. In this embodiment, the system 100 determines an actual bandwidth used for communicating content on a single stream of data from a content server (502). In this structure, a single stream of data can be forwarded to multiple clients by another entity, where the other entity uses a broadcast server or other means to communicate the single stream of data. A radio station or other content provider may desire to know how much bandwidth savings can be achieved by providing telephone access to the radio content via telephone calls versus a scenario where each caller accessing the radio content via a client device that receives the content via separate data stream. The system 100 then determines a predicted bandwidth required to communicate the content from the content server to each of the plurality of clients via individual data stream connections (504). In determining both actual bandwidth used and predicted bandwidth use, the time period used can vary as can the means for measuring bandwidth.

For example, bandwidth measurements can occur in terms of maximum data throughput in a time period, average data throughput in a time period, or total data throughput in a time period. Bandwidth measurements can further occur in terms of frequency domain usage, such as a "5 MHz signal." While modulation and encoding means greatly affect this data, the measurements can nevertheless be useful where frequency usage or transponder space require expensive costs.

The difference in actual bandwidth and predicted bandwidth is then reported by the system 100 (606). This report can show the user how much money they have saved by using the first network instead of the second network, or could show potential cost-savings if the user were to switch. In the latter instance, the report could include initial set-up costs alongside future savings. Beyond cost-savings, the report can also show the user data communication saving, time savings, or hardware resources savings. For example, perhaps the network currently in use requires use of an IT specialist, whereas switching to another network requires no specialists. In certain embodiments the report can include these cost-savings.

The time periods used in the report can likewise vary. Because most accounting practices utilize a monthly billing system, it is predicted that most users will want monthly reports showing the money saved. Nevertheless, should a user desire the time periods used to generate the reports can be hourly, daily, weekly, monthly, yearly, or any other time period of use to the user. These reports can further show cumulative savings. For instance, the report can show each month's savings over a three month window and/or the total savings for that same window. As time progresses, previous months savings can be shown alongside the current month, so as to track savings.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions.

Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein can apply to multiple types of communication networks, not only telephone networks and the Internet. Those skilled in the art will readily recognize various modifications and changes that may be made to the principles described herein without following the example embodiments and applications illustrated and described herein, and without departing from the spirit and scope of the disclosure.

We claim:

1. A method comprising:
   determining, via a processor, an actual bandwidth used for communicating a single audio stream from a content server, via the Internet, to a client, wherein the client is physically separate from the content server;
   predicting a bandwidth required to communicate the audio stream from the content server to each of a plurality of clients via individual data stream connections over the Internet, to yield a predicted bandwidth, wherein each of the plurality of clients is physically separate from the content server in the Internet;
   reporting a difference between the actual bandwidth and the predicted bandwidth;
   reporting, at a first time, available networks that are available to the plurality of clients, wherein the Internet is one of the available networks; and
   reporting, at a second time which is later than the first time and upon determining availability of the available networks to the plurality of clients changes relative to the availability of the available networks at the first time, predicted changes to bandwidth savings, monetary savings, temporal savings, hardware resource savings, and data communication savings associated with the plurality of clients.

2. The method of claim 1, wherein the difference reported comprises at least one of bandwidth savings, monetary savings, temporal savings, hardware resource savings, and data communication savings.

3. The method of claim 1, wherein the available networks comprise at least one of the Internet, a Public Switched Telephone Network, an Integrated Service Data Network, a Local Area Network, and a Virtual Private Network.

4. The method of claim 1, wherein the actual bandwidth and the predicted bandwidth are measured by at least one of maximum throughput, average throughput over a specific time period, and total throughput over the specific time period.

5. The method of claim 4, wherein the specific time period comprises at least one of a day, a week, a month, and a year.

6. The method of claim 1, where a broadcast server receives the content on the single stream of data from the content server and in turn communicates the single stream of data to a plurality of clients via individual telephone connections.

7. A system, comprising:
   a processor; and
   a memory storing instructions which, when executed by the processor, cause the processor to perform operations comprising:
      determining an actual bandwidth used for communicating a single audio stream from a content server, via the Internet, to a client, wherein the client is physically separate from the content server;
      predicting a bandwidth required to communicate the audio stream from the content server to each of a plurality of clients via individual data stream connections over the Internet, to yield a predicted bandwidth, wherein each of the plurality of clients is physically separate from the content server in the Internet;
      reporting a difference between the actual bandwidth and the predicted bandwidth;
      reporting, at a first time, available networks that are available to the plurality of clients, wherein the Internet is one of the available networks; and
      reporting, at a second time which is later than the first time and upon determining availability of the available networks to the plurality of clients changes relative to the availability of the available networks at the first time, predicted changes to bandwidth savings, monetary savings, temporal savings, hardware resource savings, and data communication savings associated with the plurality of clients.

8. The system of claim 7, wherein the difference reported comprises at least one of monetary savings, temporal savings, hardware resource savings, and data communication savings.

9. The system of claim 7, wherein the networks available comprises at least one of the Internet, a Public Switched Telephone Network, an Integrated Service Data Network, a Local Area Network, and a Virtual Private Network.

10. The system of claim 7, wherein the actual bandwidth and the predicted bandwidth are measured by at least one of maximum throughput, average throughput over a specific time period, and total throughput over the specific time period.

11. The system of claim 10, wherein the specific time period comprises at least one of a day, a week, a month, and a year.

12. A non-transitory computer-readable medium storing instructions which, when executed by a computing device, cause the computing device to perform operations comprising:
   determining an actual bandwidth used for communicating content on a single a single audio stream from a content server, via the Internet, to a client, wherein the client is physically separate from the content server;

predicting a bandwidth required to communicate the audio stream from the content server to each of a plurality of clients via individual data stream connections over the Internet, to yield a predicted bandwidth, wherein each of the plurality of clients is physically separate from the content server in the Internet;

reporting a difference between the actual bandwidth and the predicted bandwidth;

reporting, at a first time, available networks that are available to the plurality of clients, wherein the Internet is one of the available networks; and reporting, at a second time which is later than the first time and upon determining availability of the available networks to the plurality of clients changes relative to the availability of the available networks at the first time, predicted changes to bandwidth savings, monetary savings, temporal savings, hardware resource savings, and data communication savings associated with the plurality of clients.

13. The non-transitory computer-readable medium of claim 12, wherein the difference reported comprises at least one of monetary savings, temporal savings, hardware resource savings, and data communication savings.

14. The non-transitory computer-readable medium of claim 12, wherein the actual bandwidth and the predicted bandwidth are measured by at least one of maximum throughput, average throughput over a specific time period, and total throughput over the specific time period.

* * * * *